US011496501B1

United States Patent
Liu et al.

(10) Patent No.: US 11,496,501 B1
(45) Date of Patent: Nov. 8, 2022

(54) SYSTEMS AND METHODS FOR AN ADAPTIVE SAMPLING OF UNLABELED DATA SAMPLES FOR CONSTRUCTING AN INFORMATIVE TRAINING DATA CORPUS THAT IMPROVES A TRAINING AND PREDICTIVE ACCURACY OF A MACHINE LEARNING MODEL

(71) Applicant: Sift Science, Inc., San Francisco, CA (US)

(72) Inventors: Chang Liu, Seattle, WA (US); Helen Marushchenko, San Francisco, CA (US); Wei Liu, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 17/838,051

(22) Filed: Jun. 10, 2022

Related U.S. Application Data (60) Provisional application No. 63/274,835, filed on Nov. 2, 2021, provisional application No. 63/217,258, filed on Jun. 30, 2021.

(51) Int. Cl.
*H04L 9/40* (2022.01)
*G06N 5/02* (2006.01)

(52) U.S. Cl.
CPC ......... *H04L 63/1425* (2013.01); *G06N 5/022* (2013.01); *H04L 63/1416* (2013.01)

(58) Field of Classification Search
CPC .. H04L 63/1425; H04L 63/1416; G06N 5/022
See application file for complete search history.

(56) References Cited

U.S. PATENT DOCUMENTS

| | | | |
|---|---|---|---|
| 2006/0047617 A1* | 3/2006 | Bacioiu | G06N 3/08 717/124 |
| 2019/0098037 A1* | 3/2019 | Shenoy, Jr. | H04L 63/1441 |
| 2021/0097136 A1* | 4/2021 | Zhou | G06K 9/6297 |
| 2021/0279511 A1* | 9/2021 | Gordon | G06N 3/08 |
| 2021/0314333 A1* | 10/2021 | Krisiloff | G06N 5/02 |
| 2021/0326719 A1* | 10/2021 | Mahmud | G06N 20/00 |
| 2022/0012632 A1* | 1/2022 | Vasisht | G06N 20/00 |
| 2022/0058440 A1* | 2/2022 | Feng | G06K 9/6263 |

\* cited by examiner

*Primary Examiner* — Beemnet W Dada
(74) *Attorney, Agent, or Firm* — Pad Alce; Chandler Scheitlin; Alce PLLC (57) ABSTRACT

A system and method for adaptively sampling a corpus of data samples for improving an accuracy of a predictive machine learning model includes: identifying the corpus of data samples, wherein each data sample of the corpus of data samples is associated with a machine learning-derived threat inference value; stratifying the corpus of data samples into a plurality of distinct strata based on the machine learning-derived threat inference value associated with each data sample of the corpus of data samples; adaptively sampling the plurality of distinct strata; constructing a machine learning training corpus comprising a plurality of data samples based on the adaptive sampling of the plurality of distinct strata; and training the predictive machine learning model based on the machine learning training corpus.

20 Claims, 3 Drawing Sheets

Identifying a Total Sample Labeling Size S210

Stratifying a Corpus of Unlabeled Data Samples S215

Computing an Error Severity Metric for each Stratum S220

Calculating a Sampling Proportion for each Stratum S230

Adjusting Data Sampling Sizes S240

Constructing an Informative Corpus of Training Samples S250

SYSTEMS AND METHODS FOR AN ADAPTIVE SAMPLING OF UNLABELED DATA SAMPLES FOR CONSTRUCTING AN INFORMATIVE TRAINING DATA CORPUS THAT IMPROVES A TRAINING AND PREDICTIVE ACCURACY OF A MACHINE LEARNING MODEL

CROSS-REFERENCE TO RELATED APPLICATIONS

This application claims the benefit of U.S. Provisional Application No. 63/217,258, filed 30 Jun. 2021, and U.S. Provisional Application No. 63/274,835, filed 2 Nov. 2021, which are incorporated in their entireties by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enable entities to engage and perform an incalculable number of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF SUMMARY OF THE INVENTION(S)

In some embodiments, a method for adaptively sampling a corpus of unlabeled data samples for improving an accuracy of a predictive machine learning model comprises: identifying the corpus of unlabeled data samples, wherein each unlabeled data sample of the corpus of unlabeled data samples is associated with a machine learning-derived threat inference value, wherein the machine learning-derived threat inference value is a value within a predefined range of threat inference values; stratifying the corpus of unlabeled data samples into a plurality of distinct strata, wherein each distinct stratum of the plurality of distinct strata corresponds to a distinct subrange within the predefined range of threat inference values and includes one or more unlabeled data samples from the corpus of unlabeled data samples, wherein the machine learning-derived threat inference value associated with each of the one or more unlabeled data samples exists within the distinct subrange; adaptively sampling the plurality of distinct strata, wherein adaptively sampling the plurality of distinct strata includes: (i) computing an error severity metric for the each distinct stratum of the plurality of distinct strata, wherein the error severity metric computed for the each distinct stratum indicates a difference between the machine learning-derived threat inference value associated with the one or more unlabeled data samples of the each distinct stratum and an actual threat value of the one or more unlabeled data samples of the each distinct stratum; (ii) computing a sampling proportion for the each distinct stratum based on the error severity metric computed for the each distinct stratum; and (iii) sampling a plurality of unlabeled data samples from the each distinct stratum based on the sampling proportion computed for the each distinct stratum; constructing a machine learning training corpus comprising a plurality of labeled data samples based on the adaptive sampling of the plurality of distinct strata; and training the predictive machine learning model based on the machine learning training corpus.

In some embodiments, the corpus of unlabeled data samples is a subset of a second corpus of unlabeled data samples, identifying the corpus of unlabeled data samples includes: identifying a total number of unlabeled data samples to extract from the second corpus of unlabeled data samples; and randomly sampling a plurality of unlabeled data samples from the second corpus of unlabeled data samples based on the total number of unlabeled data samples to extract from the second corpus of unlabeled data samples, and the corpus of unlabeled data samples includes the plurality of unlabeled data samples randomly sampled from the second corpus of unlabeled data samples.

In some embodiments, the machine learning training corpus is constructed for a target subscriber subscribing to a digital threat mitigation service, if the target subscriber is a new subscriber to the digital threat mitigation service, the total number of unlabeled data samples to extract from the second corpus of unlabeled data samples is based on sampling size characteristics defined by other subscribers of the digital threat mitigation service, wherein the other subscribers of the digital threat mitigation service and the target subscriber belong to a same cohort, and if the target subscriber is an existing subscriber to the digital threat mitigation service, the total number of unlabeled data samples to extract from the second corpus of unlabeled data samples is based on sampling size characteristics previously defined by the target subscriber.

In some embodiments, the corpus of unlabeled data samples is identified based on determining that a performance metric of the predictive machine learning model does not satisfy pre-determined performance criteria and training the predictive machine learning model based on the machine learning training corpus aids in improving the performance metric.

In some embodiments, the corpus of unlabeled data samples includes a plurality of unlabeled digital event samples, and the subrange of threat inference values corresponding to each of the distinct stratum are mutually exclusive from one another.

In some embodiments, the predefined range of threat inference values is between 0 and 100, the distinct subrange corresponding to each of the distinct stratum are mutually exclusive from one another, and the distinct subrange corresponding to the each distinct stratum is a distinct subrange between 0-100.

In some embodiments, computing the error severity metric for the each distinct stratum includes computing an average predictive error severity metric for the each distinct stratum, and computing the average predictive error severity metric for a target stratum includes: identifying the machine learning-derived threat inference value associated with each unlabeled data sample of the target stratum; identifying the actual threat value associated with the each unlabeled data sample of the target stratum; calculating an absolute difference between the machine learning-derived threat inference value and the actual threat value associated with the each unlabeled data sample of the target stratum; summing the absolute difference calculated for the each unlabeled data sample of the target stratum; and dividing the summing by a total number of data samples in the target stratum.

In some embodiments, the actual threat value is a binary threat value indicating if a corresponding digital event is or is not fraudulent.

In some embodiments, the method further comprises after sampling the plurality of unlabeled data samples from the each distinct stratum, determining that the plurality of unlabeled data samples sampled from a first distinct stratum of the plurality of strata does not exceed a minimum sampling threshold; and in response to determining that the plurality of unlabeled data samples sampled from the first distinct stratum does not exceed the minimum sampling threshold: sampling additional unlabeled data samples from the first distinct stratum; and constructing the machine learning training corpus, wherein the machine learning training corpus includes the plurality of unlabeled data samples and the additional unlabeled data samples sampled from the first distinct stratum.

In some embodiments, constructing the machine learning training corpus with the additional unlabeled data samples sampled from the first distinct stratum prevents bias in the predictive machine learning model.

In some embodiments, the method comprises after adaptively sampling the plurality of unlabeled data samples from each of the distinct stratum, assigning a label to each unlabeled data sample of the plurality of unlabeled data samples based on a ground truth assessment performed for each of the unlabeled data samples.

In some embodiments, the predictive machine learning model is configured to estimate a severity of digital events.

In some embodiments, the corpus of unlabeled data samples is stratified into the plurality of distinct strata based on determining that the corpus of unlabeled data samples exceeds a threshold number of unlabeled data samples.

In some embodiments, a method for adaptively sampling a corpus of data samples for improving an accuracy of a predictive machine learning model comprises: identifying the corpus of data samples, wherein each data sample of the corpus of data samples is associated with a machine learning-derived threat inference value; stratifying the corpus of data samples into a plurality of distinct strata based on the machine learning-derived threat inference value associated with each data sample of the corpus of data samples; adaptively sampling the plurality of distinct strata, wherein adaptively sampling the plurality of distinct strata includes: (i) computing an error severity metric for the each distinct stratum of the plurality of distinct strata; (ii) computing a sampling proportion for the each distinct stratum based on the error severity metric computed for the each distinct stratum; and (iii) sampling a plurality of data samples from the each distinct stratum based on the sampling proportion computed for the each distinct stratum; constructing a machine learning training corpus comprising a plurality of data samples based on the adaptive sampling of the plurality of distinct strata; and training the predictive machine learning model based on the machine learning training corpus.

In some embodiments, the method comprises after sampling the plurality of data samples from the each distinct stratum, determining that the plurality of data samples sampled from one or more of the plurality of strata does not exceed a minimum sampling threshold; and in response to determining that the plurality of unlabeled data samples sampled from the one or more of the plurality of strata does not exceed the minimum sampling threshold: sampling additional unlabeled data samples from the one or more of the plurality of strata; and constructing the machine learning training corpus, wherein the machine learning training corpus includes the plurality of data samples and the additional unlabeled data samples sampled from the one or more of the plurality of strata.

In some embodiments, constructing the machine learning training corpus with the additional data samples from the one or more of the plurality of strata aids in correcting a current bias in the predictive machine learning model.

In some embodiments, a method for adaptively sampling a corpus of unlabeled digital event data samples for improving an accuracy of a predictive machine learning model comprises: identifying the corpus of unlabeled digital event data samples, wherein each unlabeled digital event data sample of the corpus of unlabeled digital event data samples is associated with a machine learning-derived threat score, wherein each machine learning-derived threat score is within a predefined threat score range; stratifying the corpus of unlabeled digital event data samples into a plurality of distinct strata, wherein each distinct stratum of the plurality of distinct strata corresponds to a distinct subrange within the predefined threat score range and includes one or more unlabeled samples from the corpus of unlabeled data samples, wherein the machine learning-derived threat score associated with each of the one or more unlabeled digital event data samples exists within the distinct subrange; adaptively sampling the plurality of distinct strata, wherein adaptively sampling the plurality of distinct strata includes: (i) computing an error severity metric for the each distinct stratum of the plurality of distinct strata; (ii) computing a sampling proportion for the each distinct stratum based on the error severity metric computed for the each distinct stratum; and (iii) sampling a plurality of unlabeled data samples from the each distinct stratum based on the sampling proportion computed for the each distinct stratum; constructing a machine learning training corpus comprising a plurality of labeled digital event data samples based on the adaptive sampling of the plurality of distinct strata; and training the predictive machine learning model based on the machine learning training corpus.

In some embodiments, the error severity metric computed for each of the distinct stratum indicates a difference between the machine learning-derived threat score associated with the one or more unlabeled digital event data samples of each of the distinct stratum and an actual threat value of the one or more unlabeled digital event data samples of the each distinct stratum.

In some embodiments, the actual threat value of the one or more unlabeled data samples of each of the distinct stratum is a binary threat value indicating if a corresponding digital event is fraudulent.

In some embodiments, the corpus of unlabeled digital event data samples is stratified into the plurality of distinct strata based on determining that the corpus of unlabeled digital event data samples exceeds a threshold number of unlabeled digital event data samples.

In some embodiments, a method for constructing a corpus of training data samples by adaptively sampling a corpus of unlabeled data samples for training and improving an accuracy of a predictive machine learning model includes: identifying a corpus of unlabeled data samples, wherein each unlabeled data sample of the corpus of unlabeled data samples is associated with a machine learning-derived threat inference value, wherein the machine learning-derived threat inference value comprises a value within a predefined range of threat inference values; stratifying the corpus of unlabeled data samples into a plurality of distinct strata, wherein each distinct stratum of the plurality of distinct strata (a) corresponds to a distinct subrange of threat inference values within the predefined range of threat inference values and (b) includes a distinct subset of the unlabeled data samples from the corpus of unlabeled data samples, wherein the machine learning-derived threat inference value associated with each unlabeled data sample in the distinct subset exists within the distinct subrange; adaptively sampling each of the plurality of distinct strata, wherein adaptively sampling each of the plurality of distinct strata includes: (i) computing an error severity metric for each of the distinct stratum of the plurality of distinct strata, wherein the error severity metric computed for each of the distinct stratum indicates a difference between the machine learning-derived threat inference value associated with each unlabeled data sample of each of the distinct stratum and an actual threat value of each unlabeled data sample of each of the distinct stratum; (ii) computing a sampling proportion for each of the distinct stratum based on the error severity metric computed for each of the distinct stratum; and (iii) sampling a plurality of unlabeled data samples from each of the distinct stratum based on the sampling proportion computed for each of the distinct stratum; constructing a machine learning training corpus comprising a plurality of labeled data samples based on the adaptive sampling of each of the plurality of distinct strata; and training the predictive machine learning model based on the machine learning training corpus.

In some embodiments, computing the error severity metric for each of the plurality of distinct strata includes computing an average predictive error severity metric for each of the plurality of distinct strata.

In some embodiments, computing the average predictive error severity metric for a target stratum includes deriving an error severity value for each unlabeled data sample of the target stratum; and averaging the error severity value derived for each unlabeled data sample of the target stratum.

In some embodiments, deriving the error severity value for a target unlabeled data sample of the target stratum includes: identifying the machine learning-derived threat inference value associated with the target unlabeled data sample; identifying the actual threat value of the target unlabeled data sample; and calculating an absolute difference between the machine learning-derived threat inference value and the actual threat value of the target unlabeled data sample.

In some embodiments, the actual threat value of each of the unlabeled data sample is a binary value indicating if a corresponding digital event is fraudulent.

In some embodiments, the sampling proportion computed for each of the distinct stratum determines a percentage of unlabeled data samples to include in the machine learning training corpus from each of the distinct stratum.

In some embodiments, computing the error severity metric for each of the distinct stratum of the plurality of distinct strata includes computing an average predictive error severity metric for each of the distinct stratum of the plurality of distinct strata, computing the sampling proportion for each of the distinct stratum includes computing a sampling proportion for a first distinct stratum, and computing the sampling proportion for the first distinct stratum includes: applying a logarithm function to the average predictive error severity metric computed for the first distinct stratum; applying a logarithm function to the average predictive error severity metric computed for remaining distinct stratum of the plurality of distinct strata; summing each result generated from applying the logarithm function to the average predictive error severity metric computed for the remaining distinct stratum of the plurality of distinct strata; and dividing an output generated from applying the logarithm function to the average predictive error severity metric computed for the first distinct stratum by a result derived from the summing.

In some embodiments, the sampling proportion computed for each of the distinct stratum sum to 1.

In some embodiments, the sampling proportion computed for each of the distinct stratum indicates a total number of unlabeled data samples to include in the machine learning training corpus from each of the distinct stratum.

In some embodiments, the method includes determining that a sampling proportion computed for a first distinct stratum of the plurality of distinct strata does not satisfy a minimum sampling threshold; and in response to determining that the sampling proportion computed for the first distinct stratum does not satisfy the minimum sampling threshold: adjusting the sampling proportion computed for the first distinct stratum to at least satisfy the minimum sampling threshold.

In some embodiments, the method includes in response to determining that the sampling proportion computed for the first distinct stratum does not satisfy the minimum sampling threshold: adjusting the sampling proportion computed for remaining distinct stratum of the plurality of distinct strata based on adjustments to the sampling proportion of the first distinct stratum.

In some embodiments, adjusting the sampling proportion computed for the first distinct stratum to at least satisfy the minimum sampling threshold prevents model bias during the training of the predictive machine learning model.

In some embodiments, the plurality of unlabeled data samples is sampled from each of the distinct stratum in a random manner.

In some embodiments, the machine learning training corpus includes the plurality of unlabeled data samples sampled from each of the distinct stratum, and constructing the machine learning training corpus includes: performing a ground truth assessment for each of the plurality of unlabeled data samples; and assigning a ground truth label to each of the plurality of unlabeled data samples based on the ground truth assessment performed for each of the plurality of unlabeled data samples.

In some embodiments, the corpus of unlabeled data samples is identified based on determining that a performance metric of the predictive machine learning model does not satisfy pre-determined performance criteria, and training the predictive machine learning model based on the machine learning training corpus aids in improving the performance metric.

In some embodiments, the corpus of unlabeled data samples includes a plurality of unlabeled digital event samples, the distinct subrange of threat inference values corresponding to each of the distinct stratum are mutually exclusive from one another, and the predictive machine learning model is configured to estimate a severity of a digital event.

In some embodiments, the corpus of unlabeled data samples is stratified into the plurality of distinct strata based on determining that the corpus of unlabeled data samples exceeds a threshold number of unlabeled data samples.

In some embodiments, the corpus of unlabeled data samples is a subset of a second corpus of unlabeled data samples, identifying the corpus of unlabeled data samples includes: identifying a total number of unlabeled data samples to extract from the second corpus of unlabeled data samples; and randomly sampling a plurality of unlabeled data samples from the second corpus of unlabeled data samples based on the total number of unlabeled data samples to extract from the second corpus of unlabeled data samples, and the corpus of unlabeled data samples includes the plurality of unlabeled data samples randomly sampled from the second corpus of unlabeled data samples.

In some embodiments, the machine learning training corpus is constructed for a target subscriber subscribing to a digital threat mitigation service, if the target subscriber is a new subscriber to the digital threat mitigation service, the total number of unlabeled data samples to extract from the second corpus of unlabeled data samples is based on sampling size characteristics defined by other subscribers of the digital threat mitigation service, wherein the other subscribers of the digital threat mitigation service and the target subscriber belong to a same cohort, and if the target subscriber is an existing subscriber to the digital threat mitigation service, the total number of unlabeled data samples to extract from the second corpus of unlabeled data samples is based on sampling size characteristics previously defined by the target subscriber.

In some embodiments, the method includes, after sampling the plurality of unlabeled data samples from each of the plurality of distinct strata, determining that the plurality of unlabeled data samples sampled from a first distinct stratum of the plurality of strata does not exceed a minimum sampling threshold; and in response to determining that the plurality of unlabeled data samples sampled from the first distinct stratum does not exceed the minimum sampling threshold: sampling additional unlabeled data samples from the first distinct stratum; and constructing the machine learning training corpus, wherein the machine learning training corpus includes the plurality of unlabeled data samples and the additional unlabeled data samples sampled from the first distinct stratum.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities, as described in U.S. Pat. No. 9,954, 879, which is incorporated herein in its entirety by this reference.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current digital events to mitigate or eliminate a digital threat associated therewith. Additionally, or alternatively, in one or more embodiments, digital event data processing decisions may be automated via automated decisioning workflows, as described in U.S. Pat. No. 9,954,879, which is incorporated herein in its entirety by this reference and digital event data processing decisions may be performed with manual input from one or more human analysts or the like. In such embodiments, decisions output from one or more review queues of the one or more human analysts may be converted to training data for training and improving one or more threat classifying models of the threat mitigation service including, but not limited to, a unified threat model.

Additionally, recognizing that traditional spam detection models often only consider a body of text of specific content for suspicious language signals, this strategy of spam detection may make it difficult to identify a risky user before the risky user creates a piece of harmful content. One or more embodiments of the present application, however, may function to construct and implement a content clustering method and system that may be capable of identifying content threat signals and providing an interface for performing content and/or user threat assessments and decisioning.

1. System for Digital Fraud and/or Abuse Detection and Scoring

Figure 1:
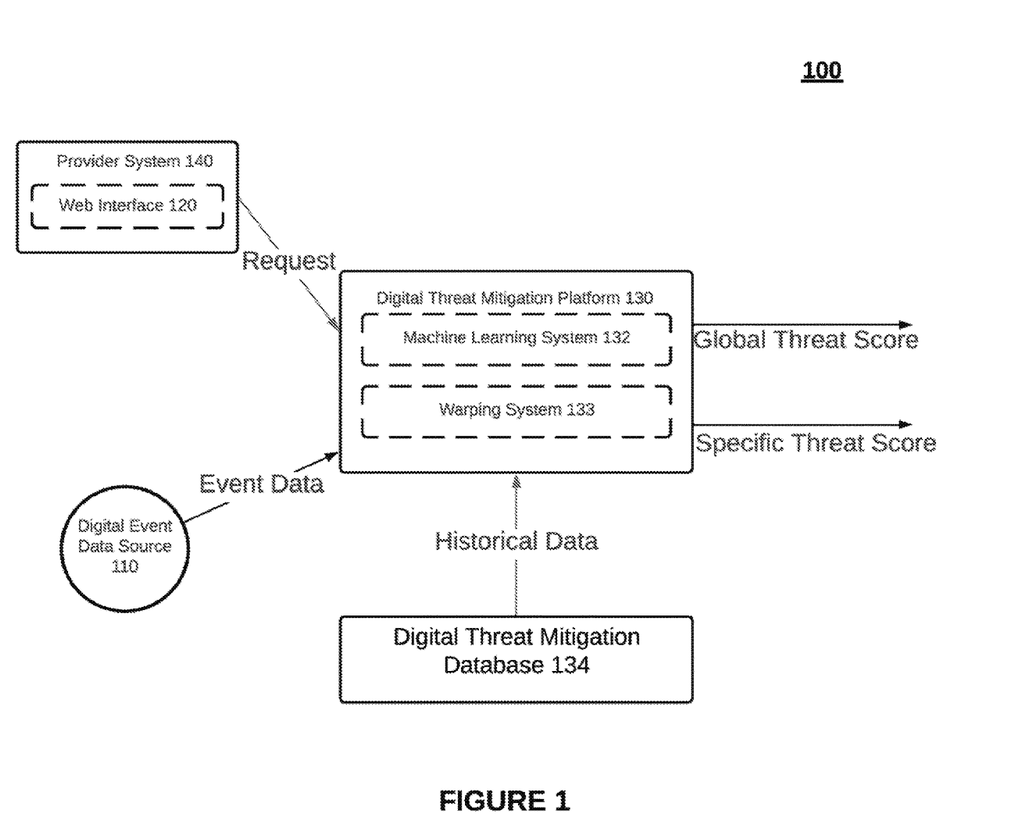
FIG. 1 illustrates a schematic representation of a system in accordance with one or more embodiments of the present application.

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables subscribers to and/or customers of a threat mitigation service implementing the system 100 to generate a request for a global digital threat score and additionally, make a request for specific digital threat scores for varying digital abuse types. After or contemporaneously with receiving a request from the web interface 120, the system 100 may function to collect digital event data from the one or more digital event data sources no. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources no may include a plurality of web servers and/or one or more data repositories associated with a plurality of service providers. Accordingly, the one or more digital event data sources 110 may also include the service provider system 140.

The one or more digital event data sources no function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implements at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources no. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources 110 and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, Mobile-BERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enables users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communicate with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. Additionally, or alternatively, the web (client) interface 120 may be used to collect manual decisions with respect to a digital event processing decision, such as hold, deny, accept, additional review, and/or the like. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores. In some embodiments, the web interface 120 comprises an application programming interface (API) client and/or a client browser.

Figure 2:
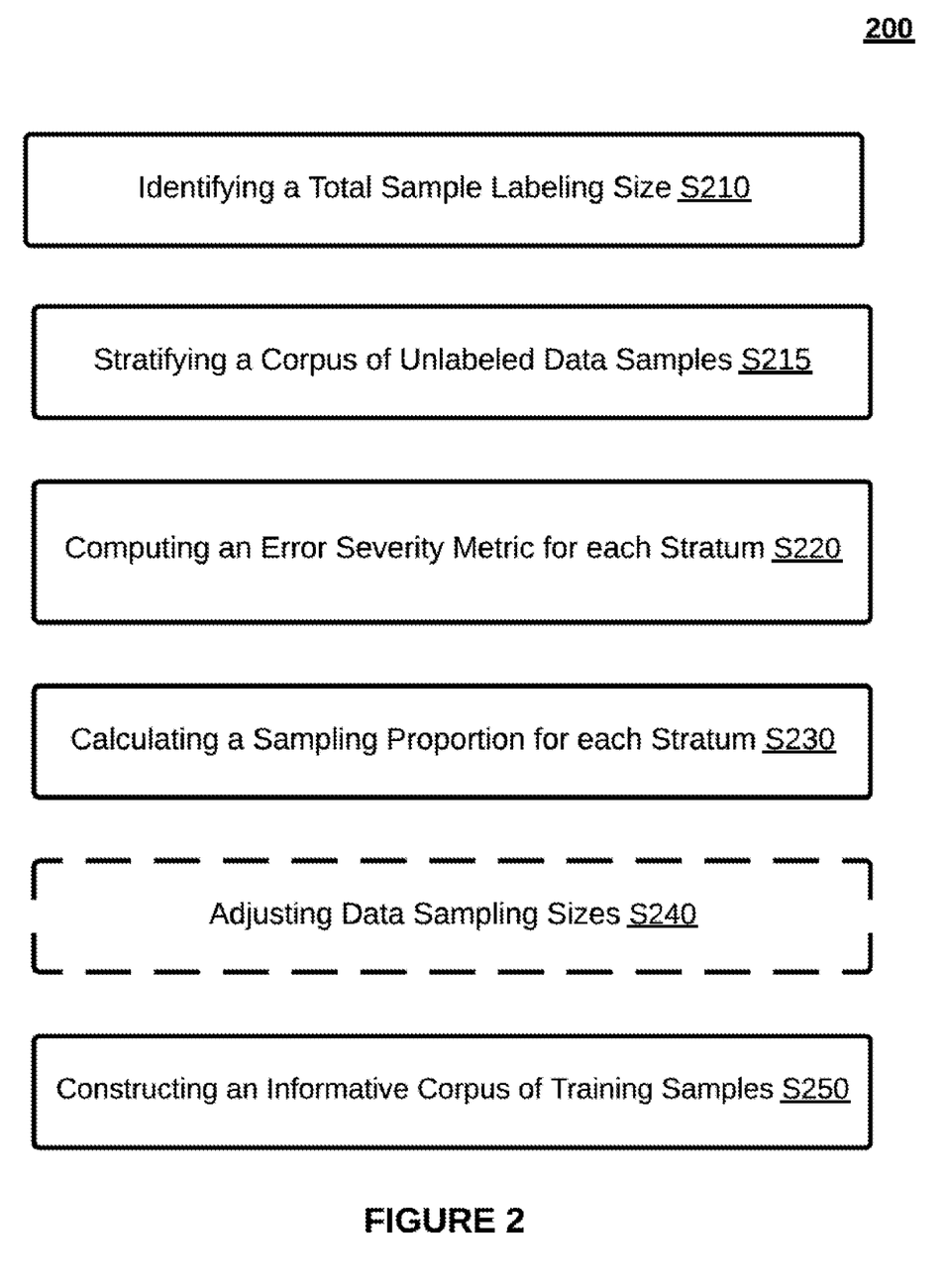
FIG. 2 illustrates an example method in accordance with one or more embodiments of the present application.
Figure 3:
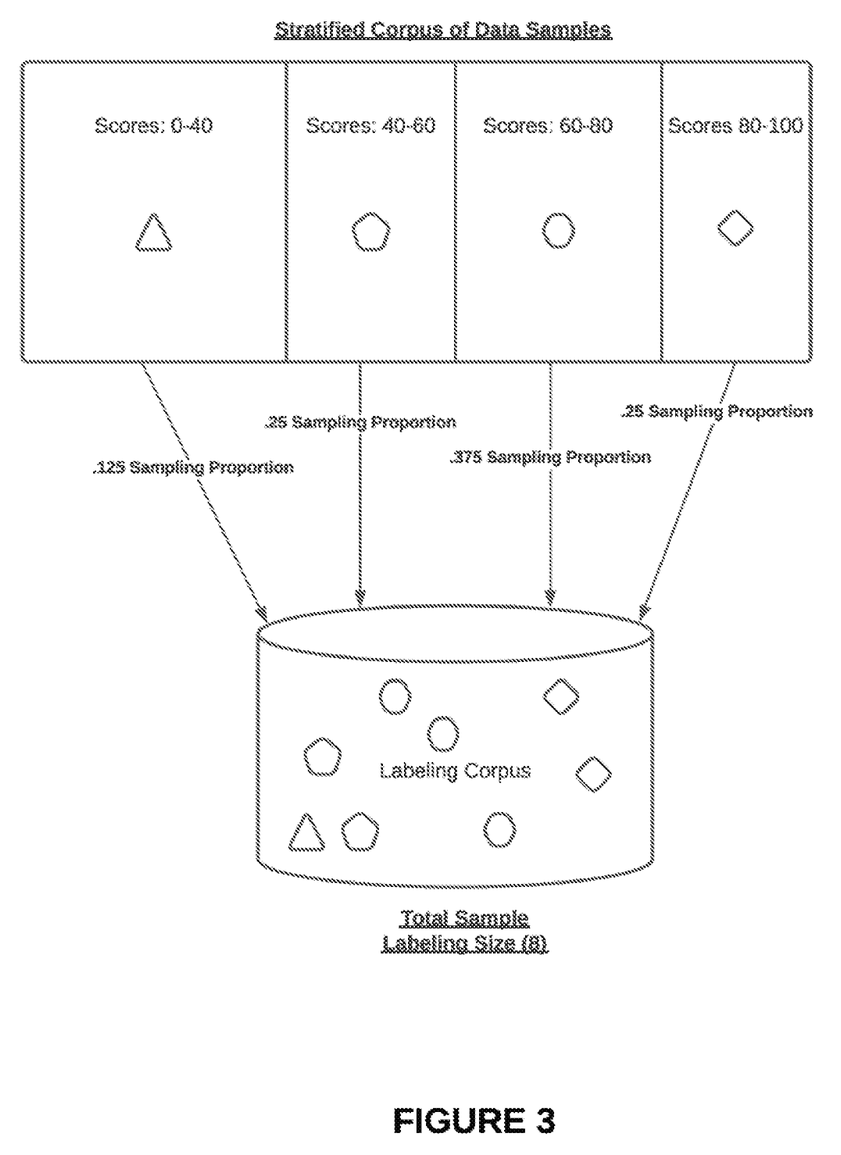
FIG. 3 illustrates an example schematic of an adaptive sampling of a stratified corpus of data samples in accordance with one or more embodiments of the present application.

Additionally, as shown in FIG. 2 and FIG. 3, the systems and methods described herein may implement the digital threat mitigation platform in accordance with the one or more embodiments described in the present application as well as in the one or more embodiments described in U.S. patent application Ser. No. 15/653,373, which is incorporated by reference in its entirety.

2. Methods for Adaptively Sampling for Labeling Data Samples and Building an Informative Corpus of Training Data Samples As shown in FIG. 2, the method 200 for adaptively sampling a population of data samples and building an informative corpus of labeled training data samples includes identifying a total data sample labeling size S210, stratifying a corpus of unlabeled data samples S215, computing an error severity metric for each stratum of data samples S220, calculating a sampling proportion for each stratum S230, adjusting data sampling sizes for one or more strata of the stratified corpus S240, and constructing an informative corpus of labeled training data samples S250.

2.10 Identifying a Sample Labeling Size for Constructing an Informative Corpus of Labeled Training Data Samples S210, which includes identifying a total data sample labeling size, may function to identify a number of data samples to be extracted via an adaptive sampling of a corpus of unlabeled data samples and then labeled for establishing an informative data corpus of labeled data samples for training a machine learning model.

In some embodiments, an informative corpus of training data may be established for training one or more machine learning models associated with specific subscribers subscribing to a service implementing the method 200 and/or the system wo. In such embodiments, S210 may function to determine and/or modify a training data sample labeling size for one or more training data corpora based on status data of a target subscriber. For instance, S210 may identify a data sampling size for a target subscriber based on identifying whether the target subscriber of a (digital threat mitigation) service implementing the system 100 and/or the method 200 may be a new or a pre-existing subscriber to the service. In some embodiments, a subscriber may be identified as a new subscriber if the subscriber has maintained a subscription with the service for less than a threshold period (e.g., 1-2 months or less) with insufficient training data samples for creating a labeled training corpus or may be determined to be an existing subscriber if the subscriber has maintained a subscription with the service for more than the threshold period and may have sufficient training data samples for creating a labeled training corpus.

New Subscriber Sample Labeling Size Determination

In a first implementation, S210 may function to identify a sample labeling size for a new subscriber. In such implementation, based on identifying an entity as a new subscriber, S210 may function to configure and/or set a sample labeling size and/or sampling ratio for sampling unlabeled training data samples for the new subscriber based on sample labeling sizes of one or more cohort subscribers or the like. That is, S210 may function to identify one or more pre-existing subscribers of the digital threat mitigation service or the like having similar or cognate operational attributes and/or the like and derive a sample labeling size for the new subscriber based on the one or more sample labeling sizes of the cohort of pre-existing subscribers. In one example, S210 may function to average or take a mean of the sample labeling sizes of the cohort and derive a sample labeling size for the new subscriber based on the average or mean. It shall be recognized that any suitable statistical or other technique (e.g., random selection, etc.) may be implemented for deriving a sample labeling size for the new subscriber based on sample labeling sizes of the cohort group of subscribers. In some embodiments, identifying a cohort of pre-existing subscribers with similar operational attributes may include identifying subscribers with a similar business domain relative to the new, target subscriber.

Existing Subscriber Sample Labeling Size Determination

Additionally, or alternatively, in a second implementation, S210 may function to identify a sample labeling size for an existing subscriber. In such implementation, S210 may function to determine or compute a sample labeling size for adaptive labeling of training data samples by assessing at least historical sample labeling sizes implemented in a prior sampling periods for the target existing subscriber and based on an assessment of a machine learning model performance implemented in a historical period that may have been trained using a training corpus established based on the historical sampling label size.

Accordingly, in some embodiments, based on a performance of the machine learning model using the historical sample labeling size, S210 may function to intelligently modify the historical sample labeling size and/or establish a new sample labeling size that is likely to improve one or more metrics of performance of the machine learning model. In other words, an existing sample labeling size may be modified to better improve the performance of the machine learning training model based on an evaluation of the machine learning model over a specific period of time, as described more in S240.

Additionally, or alternatively, in one or more embodiments, adjustments to a sample labeling size may be determined necessary for improvement of a training data corpus, per se, based on an evaluation of a labeling quality of the corpus.

For example, if the system 100 and/or the method 200 identify a labeling quality to be unsatisfactory (e.g., does not satisfy a minimum quality threshold), the method 200 may function to increase the sample labeling size of labeled data in one or more score ranges or labeled data quartiles used to train a target machine learning model. Alternatively, if the method 200 identifies the label quality to be satisfactory, there may be a decrease or no modifications to the sample labeling size.

2.15 Corpus Stratification|Splitting a Population of Unlabeled Training Data Samples S215, which includes stratifying a corpus of unlabeled data samples, may function to intelligently partition a volume of data samples into a plurality of distinct sampling groups from which samples for labeling may be sourced. In one or more embodiments, S210 and/or S215 may function to identify, source, or collect a population of data samples. In such embodiments, a number of unlabeled (or labeled) samples that may be randomly sampled from the population or corpus of data samples may be informed by or based on the computed total sample labeling size. Accordingly, unlabeled data samples may be randomly or systematically sourced from the corpus of unlabeled data samples for building an intelligently curated population of data samples (as described beginning in S220—onward) that may be adaptively labeled and implemented as a training corpus.

In one or more embodiments, S215 may function to stratify, partition, or split the population of unlabeled data samples based on threat scores or score values associated with each of a plurality of the distinct data samples within the population. In such embodiments, S215 may function to split or partition the population in a manner in which each stratum (e.g., a segment or a partition) of the population of unlabeled data samples may be defined by data samples in a discrete but continuous (threat) score range, which preferably do not overlap with any other discrete score ranges for other strata or segments of the population. In some embodiments, S215 may function to stratify, partition, or group subsets of the population of unlabeled data samples based on one or more of geographic data (e.g., country, zip code, IP address, etc.), or commodity type (e.g., catalog of an online shopping site), device type (e.g., mobile device type, iOS, Android, operating system type, and/or the like). At least one technical advantage of implementing one or more of these type of stratifications or binning of groups of unlabeled data samples, may function to improve model fairness and may ensure that underrepresented groups of samples may be sampled for creating a training corpus.

In one example, a population of data samples may include a plurality of data samples each having an assigned score value between zero (0) and one-hundred (100). In this example, S215 may function to partition the population of data samples into multiple discrete groups having data samples in a continuous score range, such as 1st group: 0-40, $2^{nd}$ group: 41-60, $3^{rd}$ group: 61-80, and $4^{th}$ group: 81-100. It shall be noted that S215 may function to partition or stratify the population of data samples into any suitable number of groups and with varying or different score ranges than the example described above.

2.20 Computing Predictive Error Severity Metric|Calculating Average Predictive Correction Value S220, which includes computing an error severity metric, may function to calculate an average predictive error severity metric (error severity) for each stratum of data samples of a stratified corpus of unlabeled data samples.

A predictive error severity metric or value, as referred to herein, preferably relates to a calculated difference between a value of an automatic decision made on a target event or activity using a machine learning model predicted (threat) score indicating a likelihood or a probability of fraud or abuse within the target event and a ground truth value determination, which may include (threat) label, score, or a risk value for the target event or activity. In one or more embodiments, a ground truth assessment of a target event or activity may include a definitive determination of fraud or non-fraud of the target event/activity based on post-target event evidences of fraud or non-fraud.

In one or more embodiments, a data sample within the population of data samples may be derived from a target digital event and/or a digital occurrence of an activity that may have been evaluated by a system (e.g., system 100) or service implementing one or more trained machine learning models that predict a digital threat score value based on the features of the digital event or occurrence. In one or more embodiments, a ground truth score or ground truth label may be derived for a digital event/occurrence from which the given data sample is derived via one or more evaluative routes including, based on an analysis of the digital event or occurrence in an event review queue, based on identifying a chargeback for the event, or based on not receiving a chargeback within a predetermined period, and/or the like.

In one example, one or more machine learning models or a machine learning system may predict or compute a threat score of 0.9 (scored between 0 and 1 or 90% probability of digital threat) for a target data sample while a true or ground truth label of 1 (100% probability of digital threat) may be determined as the actual or definitive label for the target data sample. In such example, a predicted error severity value may be determined based on calculating an absolute difference between the true label value of 1 and the machine learning predicted label value of 0.9, which is 0.1 (|1−0.9|=0.1)

Accordingly, an average predictive error severity metric or value, as referred to herein, preferably relates to an average of a plurality of distinct predictive error severity metric values of a plurality of distinct data samples within a target stratum or target sub-population of data samples (e.g., a partition, segment, or stratum of a population of data samples). In one or more embodiments, the average predictive error severity metric or value may be indicative of a magnitude of error in predictively and accurately scoring, identifying or labeling fraud and/or abuse risk in a population of data samples using one or more trained machine learning models. In one example, a stratum of data samples may include five distinct data samples having the following computed predicted error severity metrics of: 0.5, 0.1, 0.3, 0.2, and 0.15. In such example, computing the average predictive error severity metric for the stratum of data samples includes summing the five predictive error severity metrics of the data samples to a value of 1.25 and dividing the aggregated sum by the number of data samples, i.e., 5, in the stratum to arrive at an average predictive error metric value of 0.25 for the stratum of data samples.

Additionally, or alternatively, S220 may function to calculate a plurality of distinct average predictive error severity values for a target population of data samples having a plurality of distinct segments or strata of data samples. Accordingly, in one or more embodiments, S220 may function to identify each distinct segment or distinct stratum (as determined in S215) for a target population of data samples and subsequently, calculate a distinct average predictive error severity metric for each distinct stratum. In a preferred embodiment, each distinct stratum of the target population comprises a distinct and continuous digital fraud/abuse risk or threat score.

2.30 Computing Stratified Sampling Sizes Based on the Error Severity Metric

S230, which includes calculating a sampling proportion, may function to calculate a sampling proportion value for each distinct stratum of data samples of a stratified corpus of unlabeled data samples. In a preferred embodiment, S230 may function to compute a sampling proportion for each distinct stratum of the stratified corpus based on at least on an average predicted error severity metric of each target stratum of the corpus of unlabeled data samples.

A sampling proportion, as referred to herein, preferably relates to a proportional value or share value that may be calculated for each stratum of a plurality of distinct strata of a stratified corpus of data samples identifying the proportion of the overall or total sample labeling size that data samples from a given stratum may define or occupy. For example, if a calculated sampling proportion value for a target stratum is 13% or (0.13 out of 1), then randomly sampled data samples from the target stratum should make up 13% of a total sample labeling size or a corpus of randomly sampled data samples.

In a first implementation, S230 may function to compute a sampling proportion for each stratum of a stratified corpus of data samples by taking a logarithm of an average predictive error value for a target stratum divided by a sum of the logarithms of the average predictive error values for all strata of the stratified corpus of data samples. In such computation, the divisor comprises a sum of the logarithms of the average predictive error values for all strata of the stratified corpus should equal to 1 or 100%.

In one example, a stratified corpus of data samples having three distinct strata having three distinct and continuous score ranges, such as segment_1, score: 0-40; segment_2, scores: 41-80, and segment_3, scores: 81-100. In such example, S230 may function to compute a first sampling proportion of 0.25 (25%), a second sampling proportion of 0.40 (40%), and a third sampling proportion of 0.35 (35%) for each of segments_1-3, respectively. In such example, to build a total sample labeling size (N), S230 may function to randomly sample from segment_1 a number of data samples that amount to 25% of the total sample labeling size (N), from segment_2 a number of data samples that amount to 40% of the total sample labeling size (N), and from segment_3 a number of data samples that amount to 35% of the total sample labeling size.

Accordingly, S230 may function to additionally or alternatively calculate the number of data samples that may be randomly sampled from each stratum or score range of a corpus of data samples by multiplying the sampling proportion of a given stratum by the total number of data samples (N) required to build the total sample labeling size (e.g., the corpus of labeled training data samples). That is, a stratum sample labeling size or score range sample size may be computed by multiplying each distinct sampling proportion associated with each stratum/score range of data samples by a total number of labeled training samples needed to train a machine learning model.

In some embodiments, a sum of the calculated sampling proportions for each of the plurality of distinct strata or score ranges of a given corpus of unlabeled data samples may not equal to one (i) or one-hundred percent (100%). In such embodiments, S230 may function to normalize the calculated sampling proportion values to 1 or 100% and multiply the normalized sampling proportion values against the total sample labeling size to determine a distinct number of data samples to randomly sample from each of the strata or score ranges of a corpus of unlabeled data samples.

2.40 Stratum Sampling Size Adjustment

Optionally, or alternatively, S240, which includes adjusting data sampling sizes for one or more strata of the stratified corpus, may function to adjust and/or modify a value of a data sampling size for one or more strata of the stratified corpus of unlabeled data samples based on an evaluation of minimum sampling size criteria.

In some embodiments, it may be possible that a calculated data sampling size (as performed in S230) for one or more strata of the stratified corpus may not be sufficiently large (e.g., extremely small sampling sizes) thereby unduly skewing a resulting corpus of labeled training samples. Accordingly, in one or more embodiments, S240 may function to determine and/or set a distinct data sampling size threshold for each distinct stratum of data samples of the stratified corpus of unlabeled data samples thereby preventing a skew or a bias of a resulting training corpus of labeled data samples. The distinct data sampling size threshold preferably includes a minimum data sampling size for a given stratum of data samples that ensures apt representation of its data samples in a resulting training corpus of data samples.

2.50 Creating One or More Corpora of Labeled Training Data Samples

Additionally, or alternatively, S250 may function to construct an informative corpus of labeled training data samples based on adaptively sampling the stratified corpus of unlabeled data samples and labeling each of the unlabeled data samples.

In a preferred embodiment, constructing the informative corpus includes sampling each distinct stratum of the stratified corpus of unlabeled data samples based on the distinct stratum sampling size calculated for each respective stratum of data samples of the stratified corpus, as shown by way of example in FIG. 3. For instance, in one or more embodiments, each stratum of the stratified corpus of unlabeled data samples comprises a number of data samples having an associated threat score within a distinct range of machine learning-based threat scores. In this example, S250 may function to randomly sample data samples from each distinct range (i.e., stratum) of threat scores based on the distinct stratum sampling size associated with each respective range. S250 preferably functions to aggregate the data samples randomly selected from each stratum of the stratified corpus into a labeling corpus, a labeling repository or the like.

Additionally, or alternatively, S250 may function to label the data samples of a labeling corpus or that are stored within a labeling repository based on a ground truth value and/or a score value associated with each data sample. In one embodiment, a ground truth value for a given data sample may be binary (0 or 1, True or False, etc.) and thus, a resulting labeling of each data sample may also be binary since the label applied to each data sample may be informed directly by the ground truth value.

Additionally, or alternatively, S250 may function to distinctly label, with a distinct or specially-defined classification label (e.g., an informative classification label), a subset of the data samples in which a ground truth label and a machine learning-based scoring label may be misaligned. That is, in the case of a binary labeling system (e.g., 1 or 0), the ground truth label and the machine learning-based scoring label for a single data sample of the labeling corpus include both a 1 value and a 0 value. In such circumstances, it may be determined that the machine learning-based threat score computed for the data sample was an inaccurate prediction and therefore, the data sample may be considered or classified as informative for correcting future predictions of the underlying machine learning model. Accordingly, the data sample once re-labeled to the ground truth label and added to a training corpus for re-training the underlying machine learning model, which computed the inaccurate prediction or for training a new machine learning model, may function as a helpful or an influential training sample for improving a predictive accuracy of the machine learning model.

It shall be recognized that in some embodiments, the method 200 or the like may function to implement any suitable combination of the above-described configurations to adjust and/or allocate sample data based on a true proportion, and/or the like.

In one or more embodiments, S240 may function to evaluate the performance of a machine learning training model over a specific period of time.

3. Computer-Implemented Method and Computer Program Product

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for constructing a corpus of training data samples by adaptively sampling a corpus of unlabeled data samples for training and improving an accuracy of a predictive machine learning model, the method comprising:

identifying a corpus of unlabeled data samples, wherein each unlabeled data sample of the corpus of unlabeled data samples is associated with a machine learning-derived threat inference value, wherein the machine learning-derived threat inference value comprises a value within a predefined range of threat inference values;

stratifying the corpus of unlabeled data samples into a plurality of distinct strata, wherein each distinct stratum of the plurality of distinct strata (a) corresponds to a distinct subrange of threat inference values within the predefined range of threat inference values and (b) includes a distinct subset of the unlabeled data samples from the corpus of unlabeled data samples;

adaptively sampling each of the plurality of distinct strata, wherein adaptively sampling each of the plurality of distinct strata includes:
  (i) computing an error severity metric for each of the distinct stratum of the plurality of distinct strata, wherein the error severity metric computed for each of the distinct stratum indicates a difference between the machine learning-derived threat inference value associated with each unlabeled data sample of each of the distinct stratum and an actual threat value of each unlabeled data sample of each of the distinct stratum;
  (ii) computing a sampling proportion for each of the distinct stratum based on the error severity metric computed for each of the distinct stratum; and
  (iii) sampling a plurality of unlabeled data samples from each of the distinct stratum based on the sampling proportion computed for each of the distinct stratum;

constructing a machine learning training corpus comprising a plurality of labeled data samples based on the adaptive sampling of each of the plurality of distinct strata; and training the predictive machine learning model based on the machine learning training corpus.

2. The method of claim 1, wherein computing the error severity metric for each of the plurality of distinct strata includes computing an average predictive error severity metric for each of the plurality of distinct strata.

3. The method of claim 2, wherein computing the average predictive error severity metric for a target stratum includes:
  deriving an error severity value for each unlabeled data sample of the target stratum; and
  averaging the error severity value derived for each unlabeled data sample of the target stratum.

4. The method of claim 3, wherein deriving the error severity value for a target unlabeled data sample of the target stratum includes:
  identifying the machine learning-derived threat inference value associated with the target unlabeled data sample;
  identifying the actual threat value of the target unlabeled data sample; and
  calculating an absolute difference between the machine learning-derived threat inference value and the actual threat value of the target unlabeled data sample.

5. The method of claim 1, wherein the actual threat value of each of the unlabeled data samples is a binary value indicating whether a corresponding digital event is fraudulent.

6. The method of claim 1, wherein the sampling proportion computed for each of the distinct stratum determines a percentage of unlabeled data samples to include in the machine learning training corpus from each of the distinct stratum.

7. The method of claim 1, wherein:
  computing the error severity metric for each of the distinct stratum of the plurality of distinct strata includes computing an average predictive error severity metric for each of the distinct stratum of the plurality of distinct strata,
  computing the sampling proportion for each of the distinct stratum includes computing a sampling proportion for a first distinct stratum, and
  computing the sampling proportion for the first distinct stratum includes:
    applying a logarithm function to the average predictive error severity metric computed for the first distinct stratum;
    applying a logarithm function to the average predictive error severity metric computed for remaining distinct stratum of the plurality of distinct strata;
    summing each result generated from applying the logarithm function to the average predictive error severity metric computed for the remaining distinct stratum of the plurality of distinct strata; and
    dividing an output generated from applying the logarithm function to the average predictive error severity metric computed for the first distinct stratum by a result derived from the summing.

8. The method of claim 1, wherein the sampling proportion computed for each of the distinct stratum sum to 1 when aggregated.

9. The method of claim 1, wherein the sampling proportion computed for each of the distinct stratum indicates a total number of unlabeled data samples to include in the machine learning training corpus from each of the distinct stratum.

10. The method of claim 1, further comprising:
  determining that a sampling proportion computed for a first distinct stratum of the plurality of distinct strata does not satisfy a minimum sampling threshold; and
  in response to determining that the sampling proportion computed for the first distinct stratum does not satisfy the minimum sampling threshold:
    adjusting the sampling proportion computed for the first distinct stratum to at least satisfy the minimum sampling threshold.

11. The method of claim 10, further comprising:
  in response to determining that the sampling proportion computed for the first distinct stratum does not satisfy the minimum sampling threshold:
    adjusting the sampling proportion computed for remaining distinct stratum of the plurality of distinct strata based on adjustments to the sampling proportion of the first distinct stratum.

12. The method of claim 10, wherein adjusting the sampling proportion computed for the first distinct stratum to at least satisfy the minimum sampling threshold prevents model bias during the training of the predictive machine learning model.

13. The method of claim 1, wherein the plurality of unlabeled data samples is sampled from each of the distinct stratum in a random manner.

14. The method of claim 1, wherein:
  the machine learning training corpus includes the plurality of unlabeled data samples sampled from each of the distinct stratum, and constructing the machine learning training corpus includes:
  performing a ground truth assessment for each of the plurality of unlabeled data samples; and
  assigning a ground truth label to each of the plurality of unlabeled data samples based on the ground truth assessment performed for each of the plurality of unlabeled data samples.

15. The method of claim 1, wherein:
the corpus of unlabeled data samples is identified based on determining that a performance metric of the predictive machine learning model does not satisfy predetermined performance criteria, and
training the predictive machine learning model based on the machine learning training corpus aids in improving the performance metric.

16. The method of claim 1, wherein:
the corpus of unlabeled data samples includes a plurality of unlabeled digital event samples,
the distinct subrange of threat inference values corresponding to each of the distinct stratum of the plurality of distinct strata are nonoverlapping subranges, and
the predictive machine learning model is configured to estimate a severity of a digital event.

17. The method of claim 1, wherein the corpus of unlabeled data samples is stratified into the plurality of distinct strata based on determining that the corpus of unlabeled data samples exceeds a threshold number of unlabeled data samples.

18. The method of claim 1, wherein:
the corpus of unlabeled data samples is a subset of a second corpus of unlabeled data samples,
identifying the corpus of unlabeled data samples includes:
  identifying a total number of unlabeled data samples to extract from the second corpus of unlabeled data samples; and
  randomly sampling a plurality of unlabeled data samples from the second corpus of unlabeled data samples based on the total number of unlabeled data samples to extract from the second corpus of unlabeled data samples, and
the corpus of unlabeled data samples includes the plurality of unlabeled data samples randomly sampled from the second corpus of unlabeled data samples.

19. The method of claim 18, wherein:
the machine learning training corpus is constructed for a target subscriber subscribing to a digital threat mitigation service,
if the target subscriber is a new subscriber to the digital threat mitigation service, the total number of unlabeled data samples to extract from the second corpus of unlabeled data samples is based on sampling size characteristics defined by other subscribers of the digital threat mitigation service, wherein the other subscribers of the digital threat mitigation service and the target subscriber belong to a same cohort, and
if the target subscriber is an existing subscriber to the digital threat mitigation service, the total number of unlabeled data samples to extract from the second corpus of unlabeled data samples is based on sampling size characteristics previously defined by the target subscriber.

20. The method of claim 1, further comprising:
after sampling the plurality of unlabeled data samples from each of the plurality of distinct strata, determining that the plurality of unlabeled data samples sampled from a first distinct stratum of the plurality of strata does not exceed a minimum sampling threshold; and
in response to determining that the plurality of unlabeled data samples sampled from the first distinct stratum does not exceed the minimum sampling threshold:
  sampling additional unlabeled data samples from the first distinct stratum; and
  constructing the machine learning training corpus, wherein the machine learning training corpus includes the plurality of unlabeled data samples and the additional unlabeled data samples sampled from the first distinct stratum.

* * * * *